(12) United States Patent
Saiki et al.

(10) Patent No.: US 9,664,107 B2
(45) Date of Patent: May 30, 2017

(54) DRIVING DEVICE FOR HYBRID WORKING MACHINE

(71) Applicant: Kobelco Construction Machinery Co., Ltd., Hiroshima-shi (JP)

(72) Inventors: Seiji Saiki, Hiroshima (JP); Kazushige Koiwai, Hiroshima (JP); Yoichiro Yamazaki, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 146 days.

(21) Appl. No.: 13/739,137

(22) Filed: Jan. 11, 2013

(65) Prior Publication Data

US 2013/0180497 A1 Jul. 18, 2013

(30) Foreign Application Priority Data

Jan. 16, 2012 (JP) ................................. 2012-006176

(51) Int. Cl.
*F02B 75/32* (2006.01)
*F02B 75/00* (2006.01)
(Continued)

(52) U.S. Cl.
CPC ............... *F02B 75/00* (2013.01); *B60K 6/40* (2013.01); *B60K 6/485* (2013.01); *F16D 1/033* (2013.01);
(Continued)

(58) Field of Classification Search
CPC . F02B 75/32; F02B 41/04; B60K 6/40; B60K 6/485; F16D 1/033; F16D 1/076
(Continued)

(56) References Cited

U.S. PATENT DOCUMENTS

| 6,561,336 B1 * | 5/2003 | Huart | F02B 63/04 |
| | | | 123/179.28 |
| 2011/0001400 A1 * | 1/2011 | Chiba | B60K 6/40 |
| | | | 310/67 R |

FOREIGN PATENT DOCUMENTS

| CN | 1201979 A | 12/1998 |
| CN | 101405161 A | 4/2009 |

(Continued)

OTHER PUBLICATIONS

Japanese Office Action issued on Jun. 30, 2015 in Japanese Patent Application No. 2012-006176.
(Continued)

*Primary Examiner* — Hung Q Nguyen
*Assistant Examiner* — Omar Morales
(74) *Attorney, Agent, or Firm* — Oblon, McClelland, Maier & Neustadt, L.L.P.

(57) ABSTRACT

A device comprises an engine including a crank shaft with a first end portion, a generator motor including a rotor shaft with a second end portion, a flywheel with first and second connection portions connected to the first and second end portions respectively, and a fastening member. At least one of the connection portions constitutes an alignment connection portion. The first or second end portion constitutes an alignment end portion. One of the alignment connection portion and the alignment end portion includes a concave portion having an alignment inner surface, and the other includes a convex portion having an alignment outer surface. One surface of the alignment inner and outer surfaces is a tapered surface. The fastening member fastens the alignment connection portion and the alignment end portion to each other to bring a tip end of the other surface into pressure contact with the tapered surface.

6 Claims, 8 Drawing Sheets

(51) Int. Cl.
  *B60K 6/485*  (2007.10)
  *B60K 6/40*  (2007.10)
  *F16D 1/033*  (2006.01)
  *F16D 1/076*  (2006.01)

(52) U.S. Cl.
  CPC ......... *F16D 1/076* (2013.01); *B60W 2300/17* (2013.01); *Y02T 10/6226* (2013.01)

(58) Field of Classification Search
  USPC ............... 123/197.1, 197.4; 310/102 R, 75 R
  See application file for complete search history.

(56) References Cited

FOREIGN PATENT DOCUMENTS

| | | |
|---|---|---|
| CN | 101884157 A | 11/2010 |
| DE | 28 12 783 A1 | 10/1979 |
| DE | 91 03 780 U1 | 8/1991 |
| DE | 101 46 130 A1 | 4/2003 |
| DE | 10 2010 006 472 A1 | 8/2010 |
| JP | 2002-165420 | 6/2002 |
| JP | 2002165420 A * | 6/2002 |
| JP | 2002-218713 | 8/2002 |
| JP | 2005-117807 | 4/2005 |
| JP | 2008-7023 | 1/2008 |
| JP | 2008290594 A * | 12/2008 |

OTHER PUBLICATIONS

Extended European Search Report issued Jul. 14, 2016 in Patent Application No. 13151158.6.

\* cited by examiner

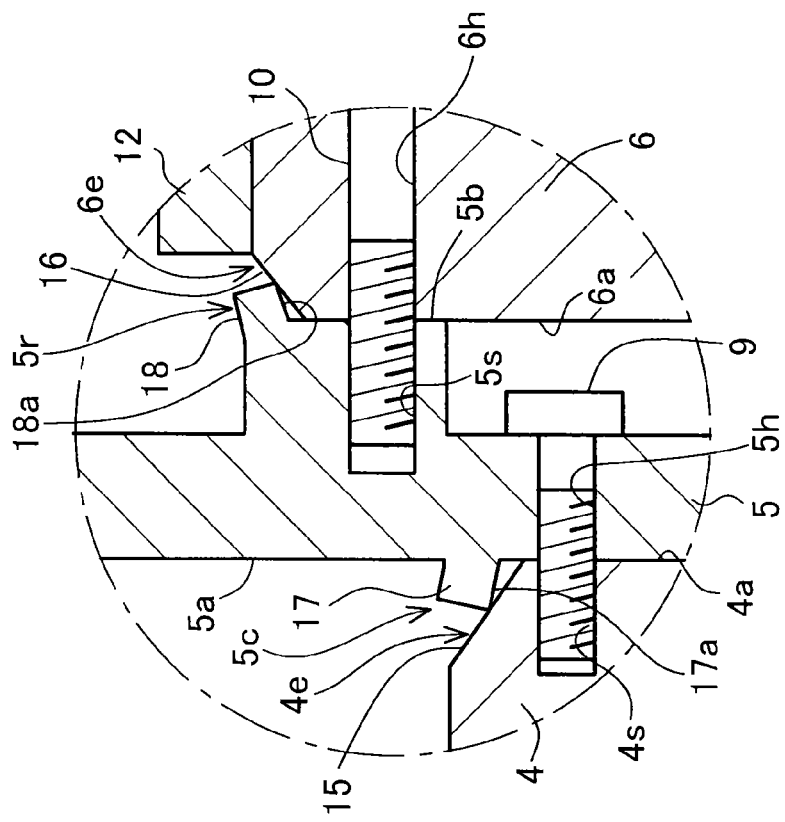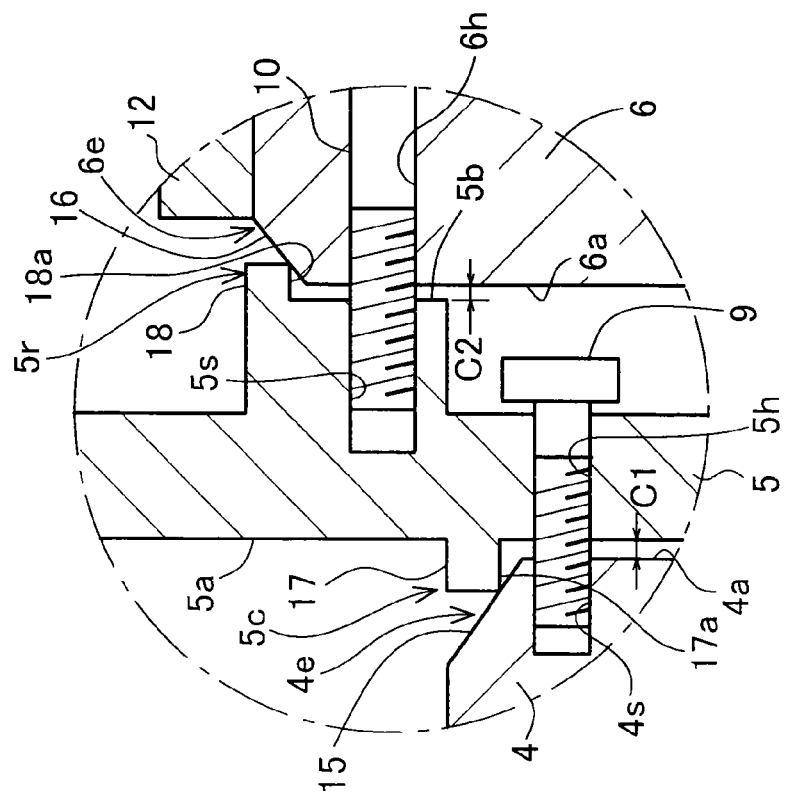

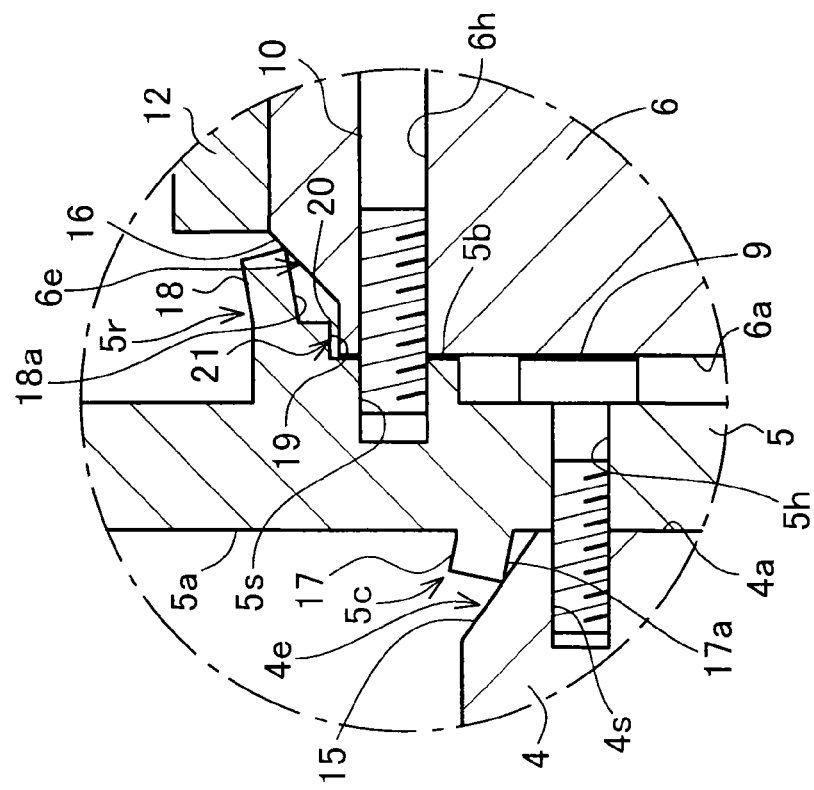
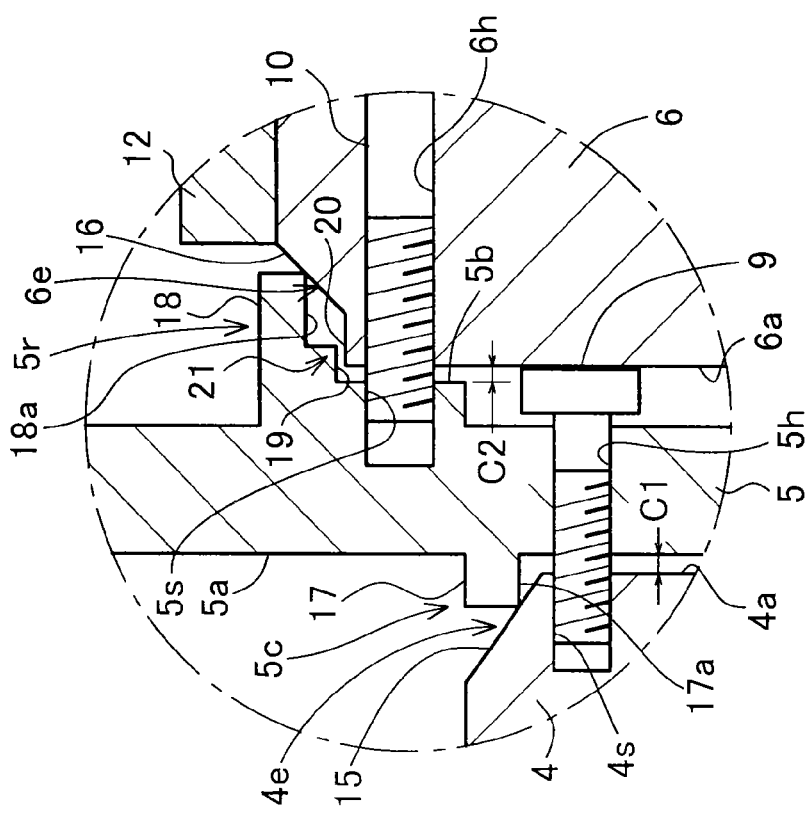

DRIVING DEVICE FOR HYBRID WORKING MACHINE

BACKGROUND OF THE INVENTION

Field of the Invention

The present invention relates to a driving device for a hybrid working machine provided with an engine and a generator motor to be driven by the engine.

Description of the Background Art

Conventionally, there has been known a hybrid excavator including an engine, a generator motor driven by the engine, and a hydraulic pump. The engine and the power generator constitute a power unit as a driving device to drive the hydraulic pump so as to make the hydraulic pump discharge hydraulic fluid, whose pressure operates a hydraulic actuator. The generator motor exhibits both of a generator function and a motor function. The generator function is converting the engine power outputted from the engine into electric power, which is charged in a capacitor. The motor function is converting the electric power accumulated in the capacitor into motor power, which assists a drive of the engine.

The engine has a crank shaft for outputting the generated engine power, and the generator motor has a rotor shaft for receiving an input of the engine power. As disclosed in e.g. Japanese Unexamined Patent Publication No. 2008-7023, the crank shaft and the rotor shaft are interconnected through a flywheel. The interconnection is performed, for example, as follows: the crank shaft, the flywheel, and the rotor shaft are coaxially aligned in such a manner that a flange surface of the crank shaft and one of the flange surfaces of the flywheel are opposed to each other and that the other of the flange surfaces of the flywheel and a flange surface of the rotor shaft face are opposed to each other; and the adjacent ones of the crank shaft, the flywheel, and the rotor shaft are fastened to each other by bolts.

Such an interconnection requires an axial alignment of coaxially aligning the members to be connected in order to suppress vibrations of the shaft at the time of rotation thereof. Conventionally, as a measure for axial alignment, there has been generally used a method of providing a convex portion to one of two flange surfaces to be connected to each other and providing a concave portion to the other, on respective entire circumferences thereof, and fitting the convex portion with the concave portion. This method, however, requires securing a proper clearance for the fit between the convex portion and the concave portion, by which an axial displacement amount may be increased to thereby make it difficult to sufficiently suppress vibrations of the shaft at the time of high-speed rotation thereof. This drawback is conspicuous especially in a horizontally mounted driving device in which a crank shaft, a flywheel, and a rotor shaft are horizontally aligned and interconnected to each other. On the other hand, setting the clearance to a value as small as possible or additionally providing a positioning pin to suppress the axial displacement amount makes it difficult to perform an assembling operation.

SUMMARY OF THE INVENTION

An object of the invention is to provide a driving device for a hybrid working machine capable of effectively suppressing vibrations of the shaft at the time of high-speed rotation thereof, without complicating an assembling operation. Provided is a driving device for a hybrid working machine comprising: an engine including a crank shaft having a first shaft end portion; a generator motor including a rotor shaft having a second shaft end portion directed to the crank shaft side, the rotor shaft and the crank shaft being disposed side by side in an axial direction thereof; a flywheel interposed between the first shaft end portion and the second shaft end portion, the flywheel including a first connection portion to be connected to the first shaft end portion and a second connection portion to be connected to the second shaft end portion; and a fastening member. At least one of the first connection portion and the second connection portion constitutes an alignment connection portion, and a shaft end portion to be connected to the alignment connection portion, out of the first shaft end portion and the second shaft end portion, constitutes an alignment shaft end portion. One portion of the alignment connection portion and the alignment shaft end portion includes a concave portion having an alignment inner circumferential surface coaxial with an axis thereof, the concave portion opening toward the other portion of the alignment connection portion and the alignment shaft end portion, and the other portion of the alignment connection portion and the alignment shaft end portion includes a convex portion having an alignment outer circumferential surface coaxial with an axis thereof. One surface of the alignment inner circumferential surface and the alignment outer circumferential surface is a tapered circumferential surface which is axially inclined and tapered toward a bottom portion of the concave portion, and the fastening member axially fastens the alignment connection portion and the alignment shaft end portion to each other so as to bring a tip end of the other of the alignment inner circumferential surface and the alignment outer circumferential surface into pressure contact with the tapered circumferential surface.

These and other objects, features and advantages of the present invention will become more apparent upon reading the following detailed description along with the accompanying drawings.

BRIEF DESCRIPTION OF THE DRAWINGS

FIG. 3A is an enlarged view of a portion indicated by III-A in FIG. 2;

FIG. 3B is a cross-sectional view showing a state that a bolt fastening has further proceeded from the state shown in FIG. 3A;

FIG. 6A is an enlarged sectional view showing a state before a flywheel and a rotor shaft are fastened to each other in a driving device according to a fourth embodiment of the invention;

FIG. 6B is a cross-sectional view showing a state that a bolt fastening is has further proceeded from the state shown in FIG. 6A;

DESCRIPTION OF THE PREFERRED EMBODIMENTS

Figure 1:
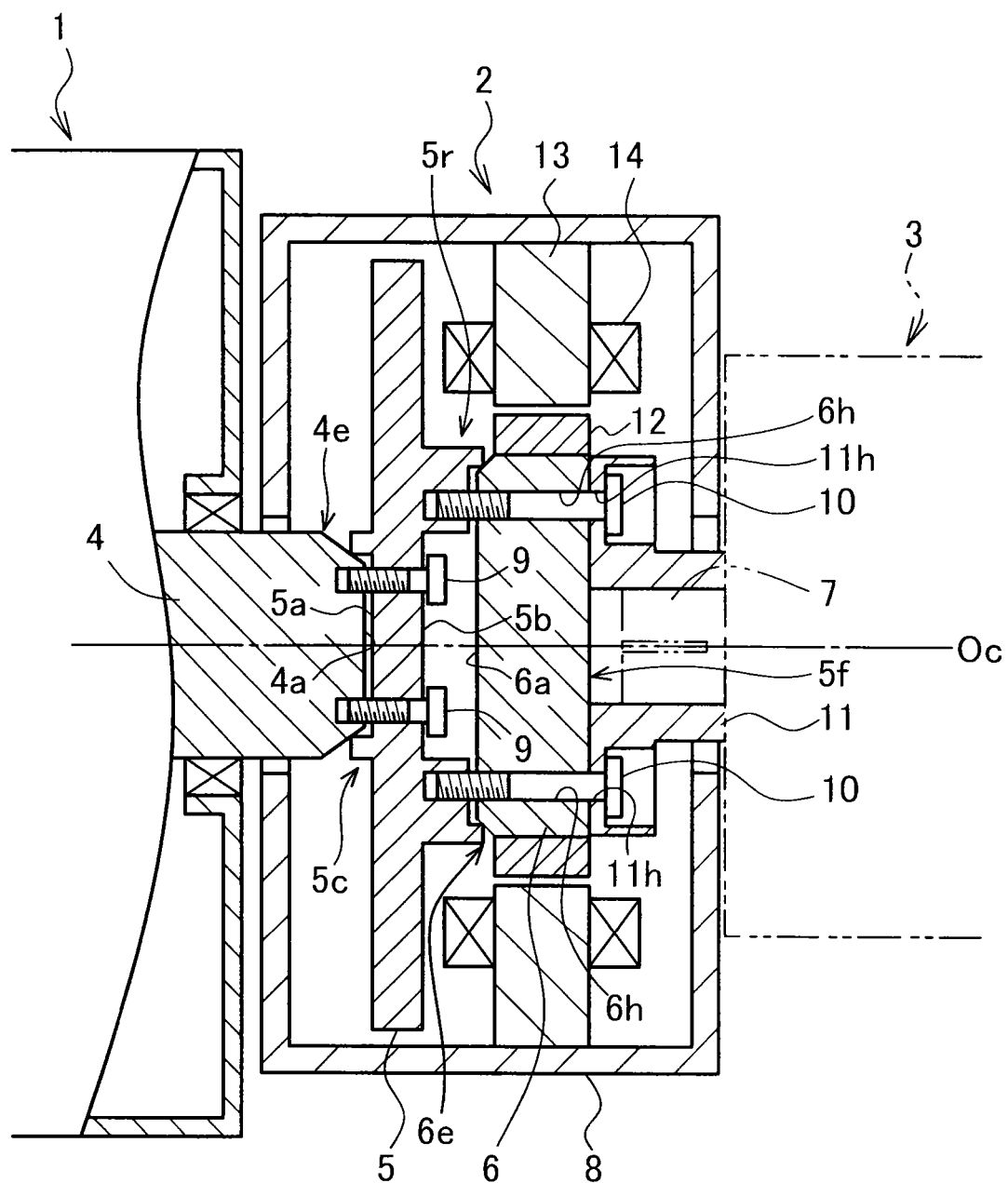
FIG. 1 is a partially sectional side view of a driving device according to a first embodiment of the invention.
Figure 2:
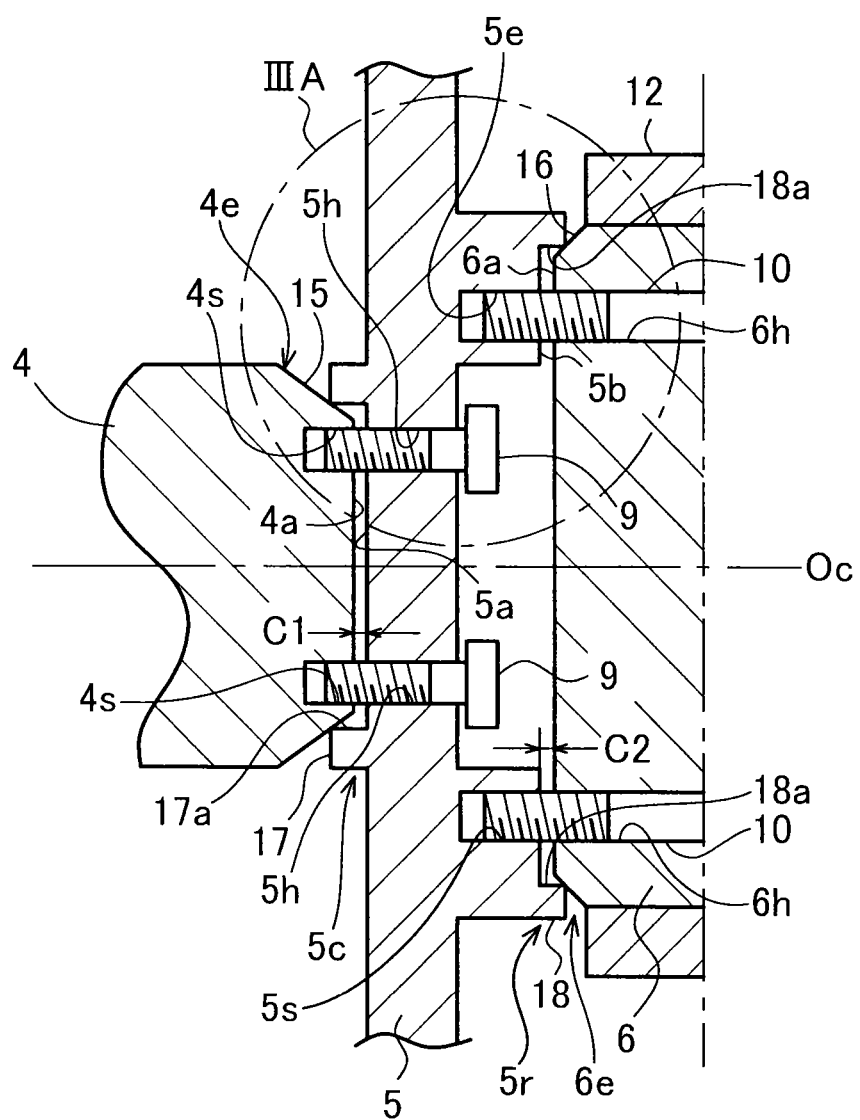
FIG. 2 is an enlarged sectional side view showing respective connection portions of a crank shaft, a flywheel, and a rotor shaft of the driving device.

A first embodiment of the invention is described referring to FIGS. 1 through 3.

The first embodiment provides a hybrid working machine shown in FIG. 1, the machine including an engine 1, a generator motor 2, a hydraulic pump 3, and a flywheel 5. The engine 1, the generator motor 2, and the flywheel 5 constitute a power unit of the hybrid working machine, that is, a driving device. The engine 1 has a crank shaft 4 as an output shaft thereof. The crank shaft 4 has a first shaft end portion 4e. The generator motor 2 has a motor housing 8, a rotor shaft 6 rotatably mounted in the motor housing 8, a rotor core 12 fixed to an outer circumference of the rotor shaft 6, a stator core 13 disposed in the periphery of the rotor core 12, and a stator coil 14 wound around the stator core 13. The rotor shaft 6 has a second shaft end portion 6e directed to the crank shaft 4 side, and a third shaft end portion 6f formed on the side opposite to the second shaft end portion 6e. The hydraulic pump 3 has a pump shaft 7 as an input shaft thereof. The flywheel 5 is interposed between the first shaft end portion 4e of the crank shaft 4 and the second shaft end portion 6e of the rotor shaft 6 in the motor housing 8. The flywheel 5 has a first connection portion 5c to be connected to the first shaft end portion 4e, and a second connection portion 5r to be connected to the second shaft end portion 6e.

The engine 1, the generator motor 2, and the flywheel 5 are disposed at such respective positions that the crank shaft 4, the flywheel 5, and the rotor shaft 6 are coaxially aligned, that is, at such positions as to have a common axis Oc, so as to be horizontally aligned in the axial direction thereof in a horizontally mount state shown in FIG. 1. In the motor housing 8, the crank shaft 4 and the flywheel 5 are axially fastened to each other by a plurality of first connecting bolts 9 as a fastening member, and the flywheel 5 and the rotor shaft 6 are axially fastened to each other by a plurality of second connecting bolts 10 as a fastening member. Besides, a third connection portion 6f of the rotor shaft 6 and the pump shaft 7 are spline-connected through a coupling 11 so as to allow the driving force of the generator motor to be transmitted.

In the first embodiment, and second through fifth embodiments to be described later, each of the first shaft end portion 4e and the second shaft end portion 6e corresponds to an alignment shaft end portion in the invention, and each of the first connection portion 5c and the second connection portion 5r corresponds to an alignment connection portion in the invention.

Next will be described a structure for interconnection of the first shaft end portion 4e of the crank shaft 4 and the first connection portion 5c of the flywheel 5, and interconnection of the second connection portion 5r of the flywheel 5 and the second shaft end portion 6e of the rotor shaft 6 in detail.

As shown in FIG. 2 and FIG. 3A, the first shaft end portion 4e of the crank shaft 4 and the first connection portion 5c of the flywheel 5 have respective flange surfaces 4a and 5a, as end surfaces opposed to each other, being juxtaposed so as to axially oppose the flange surfaces 4a and 5a to each other, with a clearance C1. In this state, the first shaft end portion 4e and the first connection portion 5c are fastened to each other so as to bring the flange surfaces 4a and 5a into close contact with each other (until the clearance C1 is set to zero), as shown in FIG. 3B, by tightening the first connecting bolts 9 in the above state.

In this embodiment, a plurality of bolt through-holes 5h passing through the flywheel 5 in the axis direction (thickness direction) thereof are formed in the flywheel 5. The crank shaft 4 is formed with axially opened screw holes 4s at respective positions corresponding to the bolt through-holes 5h. The first connecting bolts 9 are inserted through the bolt through-holes 5h from the side opposite to the crank shaft 4 and screwed into the screw holes 4s, respectively, thereby axially fastening the crank shaft 4 and the flywheel 5 to each other.

As shown in FIG. 2 and FIG. 3A, the first connection portion 5c of the flywheel 5 has an annular projecting portion 17 projecting toward the crank shaft 4 side. The axis of the projecting portion 17 coincides with the common axis Oc. In other words, the first connection portion 5c has a concave portion opening toward the crank shaft 4, the concave portion having an alignment inner circumferential surface 17a, which is a cylindrically-shaped inner circumferential surface coaxial with the common axis Oc. On the other hand, the first shaft end portion 4e of the crank shaft 4 constitutes a convex portion having an alignment outer circumferential surface 15. The alignment outer circumferential surface 15 is a tapered circumferential surface which is inclined and tapered toward a tip end of the crank shaft 4 i.e. toward a bottom portion of the concave portion constituted by the projecting portion 17. Respective shapes of the circumferential surfaces 15 and 17a are configured so that a tip end of the alignment inner circumferential surface 17a, in other words, an inner circumferential periphery of a tip end portion of the projecting portion 17, makes contact with the entire circumference of the alignment outer circumferential surface 15.

Likewise, as shown in FIG. 2 and FIG. 3A, the second connection portion 5r of the flywheel 5 and the second shaft end portion 6e of the rotor shaft 6 have respective flange surfaces 5b and 6a, as end surfaces opposed to each other. The flange surfaces 5b and 6a are juxtaposed so as to be axially opposed to each other with a clearance C2. In this state, the second connection portion 5r and the second shaft end portion 6e are fastened to each other so as to bring the flange surfaces 5b and 6a into close contact with each other (until the clearance C2 is set to zero), as shown in FIG. 3B, by tightening the second connecting bolts 10 in the above state.

In this embodiment, the coupling 11 and the rotor shaft 6a are formed with a plurality of bolt through-holes 11h and a plurality of bolt-through holes 6h axially passing through the coupling 11 and through the rotor shaft 6, respectively. The flywheel 5 is formed with axially opened screw holes 5s at respective positions corresponding to the bolt through-holes 11h and the bolt through-holes 6h. The second connecting bolts 10 are inserted into the bolt through-holes 6h from the side opposite to the flywheel 5 and screwed into the screw holes 5s, thereby axially fastening the coupling 11, the rotor shaft 6, and the flywheel 5 to each other.

As shown in FIG. 2 and FIG. 3A, the second connection portion 5r of the flywheel 5 has an annular projecting portion 18 projecting toward the rotor shaft 6 side. The axis of the projecting portion 18 coincides with the common axis Oc. In other words, the second connection portion 5r has a concave portion opening toward the rotor shaft 6, the concave portion having an alignment inner circumferential surface 18a, as a cylindrically-shaped inner circumferential surface coaxial with the common axis Oc. On the other hand, the second shaft end portion 6e of the rotor shaft 6 constitutes a convex portion having an alignment outer circumferential surface 16. The alignment outer circumferential surface 16 is a tapered circumferential surface which is inclined and tapered toward a tip end of the rotor shaft 6, i.e. toward a bottom portion of the concave portion constituted by the projecting portion 18. Respective shapes of the circumferential surfaces 16 and 18a are configured so that a tip end of the alignment inner circumferential surface 18a, in other words, an inner circumferential periphery of a tip end portion of the projecting portion 18 makes contact with the entire circumference of the alignment outer circumferential surface 16.

The alignment outer circumferential surfaces 15, 16 as the tapered circumferential surface, and the tip end of the alignment inner circumferential surface 17a, 18a, which is the inner circumferential periphery of the tip end of the projecting portion 17, 18, are in just a state of slight contact with each other, before the first and second connecting bolts 9 and 10 are tightened. From this state, the bolts 9 and 10 are tightened by rotary operation of the bolts 9 and 10 until each of the clearance C1, C2 is narrowed to a certain dimension, for instance, until each of the clearance C1, C2 disappears, specifically, until the flange surfaces 4a and 5a opposed to each other come close contact with each other and the flange surfaces 5b and 6a opposed to each other come close contact with each other, as shown in FIG. 3B. In fastening the bolts 9 and 10, the alignment outer circumferential surface 15, 16, and the tip end of the alignment inner circumferential surface 17a, 18a make pressure contact with each other, while involving radially outwardly elastic deformation of the projecting portion 17, 18, thereby allowing the alignment at the respective connection portions to be automatically performed.

The alignment thus involving elastic deformation of the projecting portion 17, 18 by tightening the bolts 9 and 10 reduces each of a tolerance of a fit between the crank shaft 4 and the flywheel 5 and a tolerance of a fit between the flywheel 5 and the rotor shaft 6 from a value corresponding to a tolerance of a "clearance fit", that is, a fit with radial clearance to a value corresponding to a tolerance of a "close fit", that is, a fit with radial interference. This enables both of the alignment between the crank shaft 4 and the flywheel 5 and the alignment between the flywheel 5 and the rotor shaft 6 to be performed with high precision. This makes it possible to effectively suppress vibrations of the shaft at the time of high-speed rotation thereof. Furthermore, the alignment operation is automatically performed by close contact of the alignment outer circumferential surface 15, 16, and the tip end of the alignment inner circumferential surface 17, 18 accompanying axial fastening of the first and second connecting bolts 9 and 10, which makes it possible to facilitate an assembling operation of the engine 1 with the crank shaft 4, the flywheel 5, and the generator motor 2 with the rotor shaft 6, in comparison with the case of decreasing a clearance or additionally using a positioning pin to enhance the alignment precision in a general fit between respective surfaces of cylindrical members.

Next will be described a second embodiment of the invention referring to FIG. 4. The following description of the second through fourth embodiments is made only about the differences between the first embodiment and the second through fourth embodiments.

Figure 4:
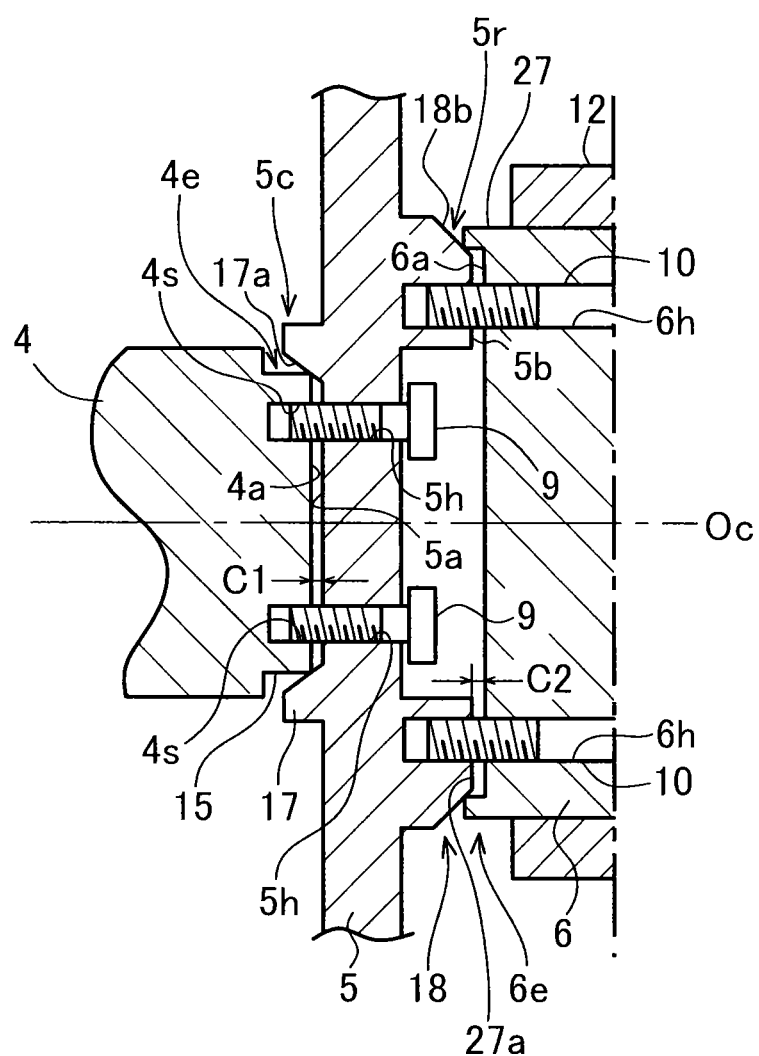
FIG. 4 is an enlarged sectional side view showing respective connection portions of a crank shaft, a flywheel, and a rotor shaft in a driving device according to a second embodiment of the invention.

In the second embodiment shown in FIG. 4, respective tapered circumferential surfaces are provided to first and second connection portions 5c and 5r of a flywheel 5, in place of provided to the first shaft end portion 4e and the second shaft end portion 6e in the first embodiment.

Specifically, regarding interconnection of a first shaft end portion 4e of a crank shaft 4 and a first connection portion 5c of a flywheel 5, the first shaft end portion 4e has an alignment outer circumferential surface 15 which is a cylindrically-shaped outer circumferential surface extending in parallel to an axis direction, while the first connection portion 5c has a projecting portion 17 which forms a concave portion including an alignment inner circumferential surface 17a, and the alignment inner circumferential surface 17a is a tapered circumferential surface which is tapered toward a bottom portion of the concave portion. The tip end of the alignment outer circumferential surface 15 i.e. an outer circumferential periphery of the first shaft end portion 4e makes contact with the entire circumference of the alignment inner circumferential surface 17a, and the first connecting bolts 9 is tighten to bring the tip end of the alignment outer circumferential surface 15 into axial pressure contact with the alignment inner circumferential surface 17a, while involving radially outward elastic deformation of the projecting portion 17; the crank shaft 4 and the flywheel 5 are thus centered to each other.

Besides, regarding interconnection of the second connection portion 5r of the flywheel 5 and a second shaft end portion 6e of a rotor shaft 6, the following structure is employed. The second shaft end portion 6e is formed with an annular projecting portion 27 axially projecting from the outer circumferential portion thereof. The projecting portion 27 has an inner circumferential surface, which constitutes an alignment inner circumferential surface 27a as a cylindrically-shaped inner circumferential surface being coaxial with a common axis Oc and extending in parallel thereto. In other word, the projecting portion 27 forms a concave portion opening toward the flywheel 5, and the inner circumferential surface of the concave portion corresponds to the alignment inner circumferential surface 27a. On the other hand, the second connection portion 5r has a projecting portion 18 with an outer circumferential surface constituting an alignment outer circumferential surface 18b, which serves as a tapered circumferential surface axially inclined and tapered toward a bottom portion of the concave portion formed by the projecting portion 27. The tip end of the alignment inner circumferential surface 27a i.e. an inner circumferential periphery of a tip end of the projecting portion 27 makes contact with the entire circumference of the alignment outer circumferential surface 18b, and the second connecting bolts 10 are tightened to bring the tip end of the alignment inner circumferential surface 27a into pressure contact with the alignment outer circumferential surface 18b, while involving radially outward elastic deformation of the projecting portion 27; thus the flywheel 5 and the rotor shaft 6 are centered to each other.

Figure 5:
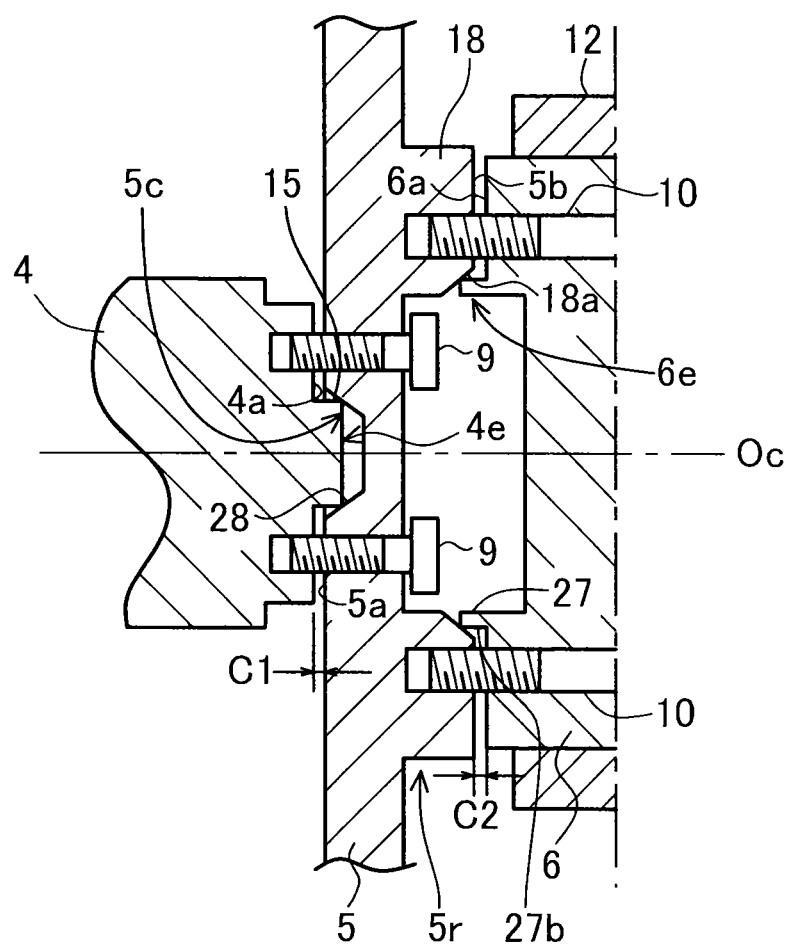
FIG. 5 is an enlarged sectional side view showing respective connection portions of a crank shaft, a flywheel, and a rotor shaft in a driving device according to a third embodiment of the invention.

Next will be described a third embodiment of the invention referring to FIG. 5. In the third embodiment, while respective tapered circumferential surfaces are provided to first and second connection portions 5c and 5r of the flywheel 5 similarly to the second embodiment, each of the tapered circumferential surfaces is constituted of an alignment inner circumferential surface.

Specifically, regarding interconnection of the first shaft end portion 4e of the crank shaft 4 and the first connection portion 5c of the flywheel 5, the following structure is employed. The first shaft end portion 4e is formed with a convex portion at its center position and the convex portion has an outer circumferential surface which constitutes an alignment outer circumferential surface 15. The alignment outer circumferential surface 15 is a cylindrically-shaped outer circumferential surface being coaxial with the common axis Oc and extending in parallel to an axis direction. On the other hand, the first connection portion 5c has no aforementioned projecting portion 17 and a main body portion of the flywheel 5 is formed with a concave portion opening toward the crank shaft 4, and the concave portion has an inner circumferential surface which constitutes an alignment inner circumferential surface 28. The alignment inner circumferential surface 28 is a tapered circumferential surface which is tapered toward a bottom portion of the concave portion. The tip end of the alignment outer circumferential surface 15, i.e. an outer circumferential periphery of a tip end of the convex portion of the first shaft end portion 4e, makes contact with the entire circumference of the alignment inner circumferential surface 28, and the first connecting bolts 9 is tightened to bring the tip end of the alignment outer circumferential surface 15 into axial pressure contact with the alignment inner circumferential surface 28; thus the crank shaft 4 and the flywheel 5 are centered to each other.

Besides, regarding interconnection of the second connection portion 5r of the flywheel 5 and a second shaft end portion 6e of a rotor shaft 6, the following structure is employed. The second shaft end portion 6e is formed with an annular projecting portion 27 axially projecting from the middle portion thereof. The projecting portion 27 has an outer circumferential surface which constitutes an alignment outer circumferential surface 27b which is a cylindrically-shaped outer circumferential surface being coaxial with a common axis Oc and extending in parallel thereto. On the other hand, the second connection portion 5r has a projecting portion 18 with an alignment inner circumferential surface 18a, which is a tapered circumferential surface axially inclined and tapered toward a bottom portion of a concave portion constituted by the projecting portion 18. The tip end of the alignment outer circumferential surface 27b, i.e. an outer circumferential periphery of a tip end of the projecting portion 27, makes contact with the entire circumference of the alignment inner circumferential surface 18a, and the second connecting bolts 10 is tightened to bring the tip end of the alignment outer circumferential surface 27b into axial pressure contact with the alignment inner circumferential surface 18a while involving radially inward elastic deformation of the projecting portion 27; thus the flywheel 5 and the rotor shaft 6 are centered to each other.

The third embodiment may be altered, for example, as follows. It is also permitted to form a concave portion corresponding to the concave portion having the alignment inner circumferential surface 28 formed in the first connection portion 5c shown in FIG. 5 at the center of an end surface of the crank shaft 4, i.e. on the flange surface 4a, and, conversely, to form a convex portion corresponding to the convex portion having the alignment outer circumferential surface 15 formed in the first shaft end portion 4e shown in FIG. 5, at the center of the first connection portion 5r of the flywheel 5. Likewise, it is also permitted to form a projecting portion corresponding to the projecting portion 27 having the alignment outer circumferential surface 27b formed on the second shaft end portion 6e at the center of the flywheel 5, and, conversely, to form a projecting portion corresponding to the projecting portion 18 having the alignment inner circumferential surface 18a formed on the second connection portion 5r shown in FIG. 5, on the second shaft end portion 6e of the rotor shaft 6.

Next will be described a fourth embodiment of the invention referring to FIGS. 6A and 6B. In the fourth embodiment, the flywheel 5 and the rotor shaft 6 according to the first embodiment are formed with a positioning recess 19 and a positioning projection 20, respectively, which can be fitted with each other. The positioning recess 19 and the positioning projection 20 are fitted with each other with a clearance, involved by tightening the first connecting bolts 9, thus positioning the flywheel 5 and the rotor shaft 6 radially and relatively to each other.

Specifically, the positioning recess 19 is formed at a portion of the projecting portion 18 formed in the second connection portion 5r of the flywheel 5, the portion being located at a back side of an alignment inner circumferential surface 18a of the projecting portion, and has an inner diameter smaller than the diameter of the alignment inner circumferential surface 18a. On the other hand, the positioning projection 20 projects toward the flywheel 5 beyond a portion, where the alignment outer circumferential surface 16 is formed, of a second shaft end portion 6e of the rotor shaft 6. The positioning projection 20 has an outer diameter which is substantially equal to or smaller than the smallest diameter of the alignment outer circumferential surface 16 and smaller than the inner diameter of the positioning recess 19.

Thus provided positioning structure 21 based on the positioning recess 19 and the positioning projection 20 is capable of assisting rough alignment between the flywheel 5 and the rotor shaft 6 before the first connecting bolts 9 are fastened, that is, radial positioning between the flywheel 5 and the rotor shaft 6, thereby allowing assembling operation to be facilitated. This effect can be also similarly obtained by forming the positioning recess 19 in the rotor shaft 6 and providing the positioning projection 20 to the flywheel 5.

Figure 7:
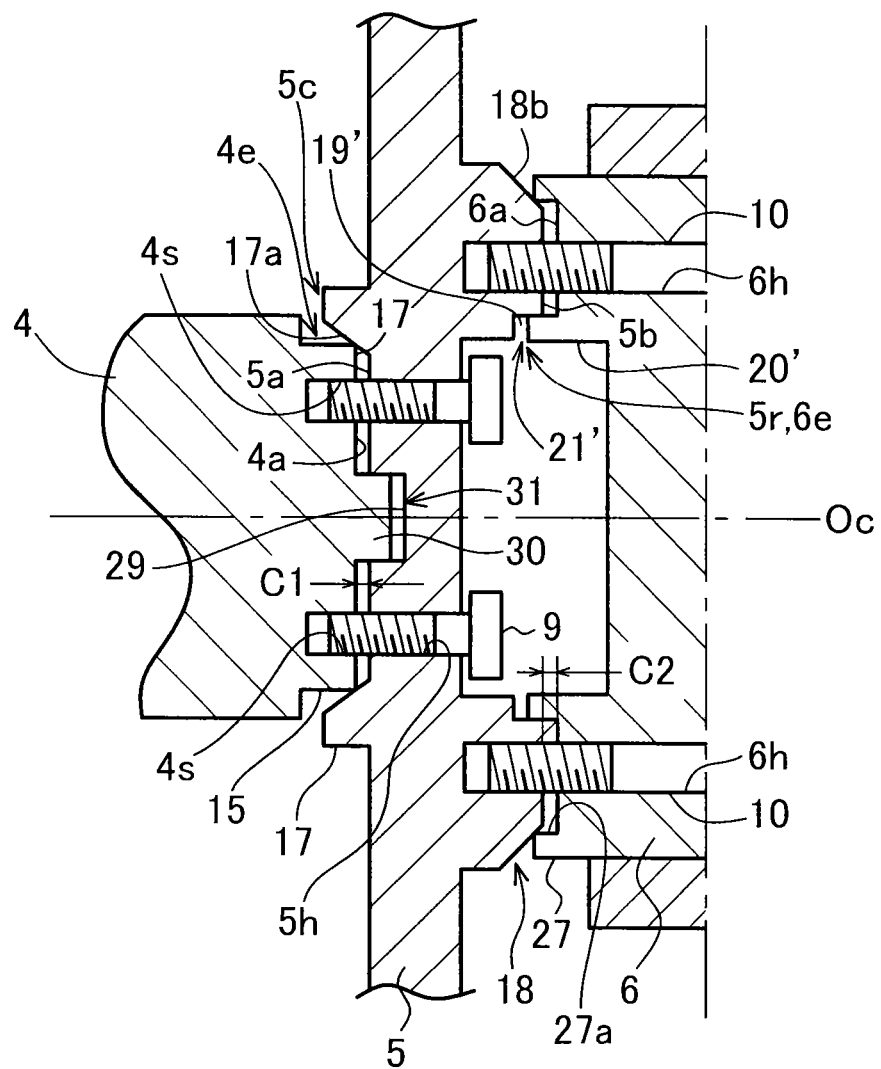
FIG. 7 is an enlarged sectional side view showing respective connection portions of a crank shaft, a flywheel, and a rotor shaft in a driving device according to a fifth embodiment of the invention.

Furthermore, as shown in FIG. 7 illustrating a fifth embodiment, it is also possible to apply a positioning structure substantially equivalent or identical to the positioning structure 21, for interconnection of the crank shaft 4 and the flywheel 5. The fifth embodiment is based on the structure of the second embodiment shown in FIG. 4 and additionally includes positioning structures 21' and 31.

The positioning structure 21' is constituted by a positioning recess 19' formed in a flywheel 5 and a positioning projection 20' formed in a rotor shaft 6. The positioning recess 19' is formed in the inside of a projecting portion 18 formed in a second connection portion 5r. The positioning projection 20' to be fitted into the positioning recess 19' with a clearance annularly projects in an end surface of a second shaft end portion 6e of the rotor shaft 6. This means that the positioning structure 21' in the fifth embodiment is configured independently of an alignment structure based on the combination of an alignment outer circumferential surface 18b and an alignment inner circumferential surface 27a, at a position radially inwardly away from the alignment structure. However, conversely to the above, the positioning structure 21' may be configured at a position radially outwardly away from the alignment structure.

The positioning structure 31 is constituted of a positioning recess 29 formed in the flywheel 5 and a positioning projection 30 formed in the crank shaft 4. The positioning recess 29 is formed in the center of a first connection portion 5c, i.e. at a position inside of an annular projecting portion 17, while the positioning projection 30 columnarly projects in the center of an end surface of a first shaft end portion 4e. This means that the positioning structure 31 is also configured independently of an alignment structure based on the combination of an alignment outer circumferential surface 15 and an alignment inner circumferential surface 17*a*, at a position radially inwardly away from the alignment structure. Conversely to the above, the positioning structure 31 may be configured at a position radially outwardly away from the alignment structure. However, configuring a positioning structure in a radially inward region of the alignment outer circumferential surface and the alignment inner circumferential surface, as described in the positioning structures 21, 21' and 31, enables the positioning structure to be additionally provided with no intolerable increase in the diameter of an alignment shaft end portion or an alignment connection portion.

Figure 8:
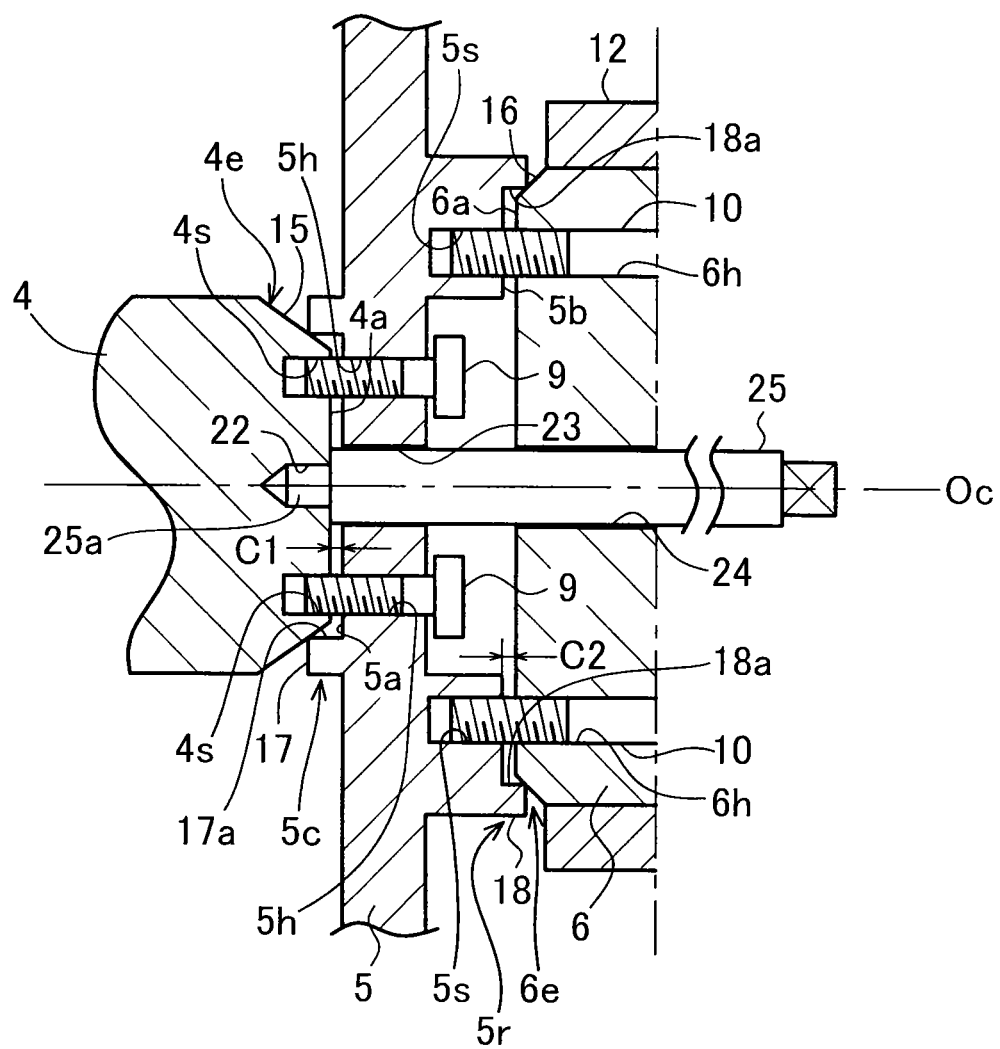
FIG. 8 is an enlarged sectional side view showing an example of using a jig for coaxially aligning a crank shaft, a flywheel, and a rotor shaft.

Furthermore, for a horizontally mounted device such as the embodiments shown in FIGS. 1 through 7 where the common axis Oc horizontally extends, there can be used a jig 25 as shown in FIG. 8 to further facilitate the assembling operation.

The structure shown in FIG. 8 is based on the structure described in the first embodiment and additionally includes a jig mounting hole 22, and guide holes 23 and 24. The jig mounting hole 22 extends from a flange surface 4*a* as an end surface of a crank shaft 4 along an axis of the crank shaft 4. The guide holes 23 and 24 are respective through-holes axially passing through a shaft portion of the flywheel 5 and a shaft portion of the rotor shaft 6. The jig 25 has an outer diameter which allows the jig 25 to be inserted into the guide holes 23 and 24 with a proper clearance, and has a tip end portion 25*a* capable of being fixed to the crank shaft 4 while inserted in the jig mounting hole 22.

In a state that the tip end portion 25*a* of the jig 25 is fixed to the crank shaft 4, that is, in a state that the jig 25 horizontally and outwardly projects from the shaft portion of the crank shaft 4, the flywheel 5 and the rotor shaft 6 is fitted to the jig 25 in this order so that the jig 25 is inserted into the guide holes 23 and 24; thus, the crank shaft 4, the flywheel 5, and the rotor shaft 6 can be easily set to an assembly ready position in a state that the axes of the crank shaft 4, the flywheel 5, and the rotor shaft 6 substantially coincide with each other, that is, in a state that the crank shaft 4, the flywheel 5 and the rotor shaft 6 are roughly aligned with each other. This allows an assembling operation, especially that of a horizontally mounted device, to be easily performed.

The jig mounting hole 22 and the guide holes 23, 24 of the flywheel 5 can be simple holes or can be screw holes. Alternatively, it is also permitted that the guide hole 24 of the rotor shaft 6 is a screw hole while a male screw to be engaged with the guide hole 24 may be formed in an outer circumferential surface of the jig 25. This structure allows the rotor shaft 6 to be axially moved by rotational operation of the jig 25. This enables the rotor shaft 6 to be smoothly set to an assembly ready position with no influence of a permanent magnet, in the case where the rotor core 12 includes the permanent magnet therewithin.

The alignment structure according to the invention, that is, a structure based on the combination of an alignment outer circumferential surface and an alignment inner circumferential surface, may be applied to either one of the interconnection of the crank shaft 4 and the flywheel 5 and the interconnection between the flywheel 5 and the rotor shaft 6. Specifically, the invention also permits that; either one of the first connection portion and the second connection portion of the flywheel constitutes an alignment connection portion; a shaft end portion to be connected to the alignment connection portion, out of the first shaft end portion of the crank shaft and the second shaft end portion of the rotor shaft, constitutes an alignment shaft end portion; and the combination of the alignment outer circumferential surface and the alignment inner circumferential surface is applied only to the alignment connection portion and to the alignment shaft end portion.

The invention is widely applicable, in addition to a hybrid excavator, to a variety of hybrid working machines where an engine and a generator motor are coaxially interconnected.

As described above, the invention provides a driving device for a hybrid working machine, the device being capable of effectively suppressing vibrations of a shaft at the time of high-speed rotation thereof, without complicating an assembling operation. The driving device comprises: an engine including a crank shaft having a first shaft end portion; a generator motor including a rotor shaft having a second shaft end portion directed to the crank shaft side, the rotor shaft and the crank shaft being disposed side by side in an axial direction thereof; a flywheel interposed between the first shaft end portion and the second shaft end portion, the flywheel including a first connection portion to be connected to the first shaft end portion and a second connection portion to be connected to the second shaft end portion; and a fastening member. At least one of the first connection portion and the second connection portion constitutes an alignment connection portion, and a shaft end portion to be connected to the alignment connection portion, out of the first shaft end portion and the second shaft end portion, constitutes an alignment shaft end portion. One portion of the alignment connection portion and the alignment shaft end portion includes a concave portion having an alignment inner circumferential surface coaxial with an axis thereof, the concave portion opening toward the other portion of the alignment connection portion and the alignment shaft end portion, and the other portion of the alignment connection portion and the alignment shaft end portion includes a convex portion having an alignment outer circumferential surface coaxial with an axis thereof. One circumferential surface of the alignment inner circumferential surface and the alignment outer circumferential surface is a tapered circumferential surface which is axially inclined and tapered toward a bottom portion of the concave portion, and the fastening member axially fastens the alignment connection portion and the alignment shaft end portion to each other so as to bring a tip end of the other of the alignment inner circumferential surface and the alignment outer circumferential surface into pressure contact with the tapered circumferential surface.

In the thus constructed driving device, the alignment connection portion and the alignment shaft end portion are axially fastened to each other by the fastening member in a state that the tip end of the other surface of the alignment inner circumferential surface and the alignment outer circumferential surface makes contact with the tapered circumferential surface of the alignment inner circumferential surface and the alignment outer circumferential surface; this enables a tolerance of the fit between the alignment connection portion and the alignment shaft end portion to be reduced from a value corresponding to a tolerance of a "clearance fit" to a value corresponding to a tolerance of a "close fit", thereby allowing both of the alignment, that is, the alignment between the alignment connection portion and the alignment shaft end portion (at least one of the alignment between the crank shaft and the flywheel and the alignment between the flywheel and the rotor shaft), to be performed with high precision. This makes it possible to effectively suppress vibrations of a shaft at the time of high-speed rotation thereof. Furthermore, the alignment function can be obtained merely by fastening by use of the fastening member in a contact state of the alignment inner circumferential surface and the alignment outer circumferential surface with each other, thus allowing the assembling operation of the device to be facilitated, in comparison with the case of minimizing a clearance, in a conventional arrangement by a fit between respective surfaces of cylindrical members, to enhance the alignment precision.

It is preferable that: one of the alignment connection portion and the alignment shaft end portion may be formed with an annular projecting portion projecting toward the other of the alignment connection portion and the alignment shaft end portion; an inner circumferential surface (or an outer circumferential surface) of the projecting portion may constitute the alignment inner circumferential surface (or the alignment outer circumferential surface); and the fastening member may fasten the alignment connection portion and the alignment shaft end portion to each other so as to bring the alignment inner circumferential surface (or the alignment outer circumferential surface) and the alignment outer circumferential surface (or the alignment inner circumferential surface) into pressure contact with each other, while involving outwardly (or inwardly) elastic deformation of the projecting portion. The elastic deformation of the projecting portion allows the alignment outer circumferential surface (or the alignment inner circumferential surface) to be wedged into the inside (or the outside) of the projecting portion, thereby enabling the alignment precision to be further enhanced.

Moreover, in the case where the alignment connection portion and the alignment shaft end portion have respective end surfaces opposed to each other, it is more preferable that the projecting portion is elastically deformed so as to allow the fastening by the fastening member to proceed enough to bring the end surfaces into contact with each other. The contact of the end surfaces with each other allows the relative positioning precision between the alignment connection portion and the alignment shaft end portion not only in a radial direction but also in an axial direction to be enhanced.

It is preferable that: one of the alignment shaft end portion and the alignment connection portion is formed with a positioning projection axially projecting toward the other of the alignment shaft end portion and the alignment connection portion; the other of the alignment shaft end portion and the alignment connection portion is formed with a positioning recess capable of being fitted with the positioning projection; and the positioning projection and the positioning recess are fitted with each other to radially position the alignment shaft end portion and the alignment connection portion relatively to each other. The additional use of the positioning structure based on the combination of the positioning projection and the positioning recess allows the assembling operation to be more easily performed.

In this arrangement, the positioning projection and the positioning recess may be preferably formed in a radially inward region of the alignment outer circumferential surface and the alignment inner circumferential surface. This allows the positioning structure to be additionally provided with no intolerable increase in the diameter of the alignment shaft end portion and the alignment connection portion.

Besides, in the invention, it is desirable to form a jig mounting hole in the first shaft end portion of the crank shaft, the jig mounting hole extending along an axis of the crank shaft and receiving a tip end of the jig to allow the jig to be fixed to the crank shaft in a state that the jig is inserted into the jig mounting hole, and to form a guide hole in each center of respective shaft portions of the flywheel and the rotor shaft, the guide hole allowing the jig to be inserted through the guide hole. In this structure, the jig, fixed to the center of the crank shaft and inserted through the guide holes in the flywheel and in the rotor shaft, allows the crank shaft, the flywheel, and the rotor shaft to be substantially centered to each other, thereby facilitating an assembling operation of especially a horizontally mounted driving device.

This application is based on Japanese Patent Application No. 2012-006176 filed on Jan. 16, 2012, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A driving device for a hybrid working machine, the driving device comprising:
   an engine including a crank shaft with a first shaft end portion;
   a generator motor including a rotor shaft with a second shaft end portion directed to the crank shaft side, the rotor shaft and the crank shaft being disposed side by side in an axial direction thereof;
   a flywheel interposed between the first shaft end portion and the second shaft end portion, the flywheel including a first connection portion to be connected to the first shaft end portion and a second connection portion to be connected to the second shaft end portion; and
   a fastening member, wherein:
   at least one of the first connection portion and the second connection portion constitutes an alignment connection portion, and a shaft end portion to be connected to the alignment connection portion, out of the first shaft end portion and the second shaft end portion, constitutes an alignment shaft end portion;
   the alignment connection portion includes an annular projecting portion projecting toward the alignment shaft end portion and having an alignment inner circumferential surface coaxial with an axis of the alignment connection portion, the annular projecting portion forming a concave portion opening toward the alignment shaft end portion, and the alignment shaft end portion includes a convex portion having an alignment outer circumferential surface coaxial with an axis of the alignment shaft end portion; and
   the alignment outer circumferential surface is a tapered outer circumferential surface axially inclined and tapered toward a bottom portion of the concave portion, and the fastening member axially fastens the alignment connection portion and the alignment shaft end portion to each other in a state where the tapered outer circumferential surface of the alignment shaft end portion makes pressure contact with a tip end of the alignment inner circumferential surface of the annular projecting portion of the alignment shaft end portion, so as to deform the annular projecting portion radially outwardly elastically by the pressure contact of the tip end of the alignment inner circumferential surface with the tapered outer circumferential surface, the pressure contact coaxially aligning the alignment connection portion with the alignment shaft end portion.

2. The driving device according to claim 1, wherein the alignment connection portion and the alignment shaft end portion have respective end surfaces opposed to each other, and the projecting portion is elastically and radially outwardly deformed in such a manner as to allow fastening by the fastening member to proceed enough to bring the end surfaces into contact with each other.

3. The driving device according to claim 1, wherein one of the alignment shaft end portion and the alignment connection portion is formed with a positioning projection axially projecting toward the other of the alignment shaft end portion and the alignment connection portion; the other of the alignment shaft end portion and the alignment connection portion is formed with a positioning recess capable of being fitted with the positioning projection; and the fit of the positioning projection and the positioning recess with each other radially positions the alignment shaft end portion and the alignment connection portion to each other.

4. The driving device according to claim 1, wherein a jig mounting hole is formed in the first shaft end portion of the crank shaft, the jig mounting hole extending along an axis of the crank shaft and receiving a tip end of a jig to allow the jig to be fixed to the crank shaft in a state that the jig is inserted into the jig mounting hole, while a guide hole is formed in each center of respective shaft portions of the flywheel and the rotor shaft, the guide hole allowing the jig to be inserted through the guide hole.

5. The driving device according to claim 1, wherein the first shaft end portion includes said tapered circumferential surface and said flywheel includes said tip end, said tip end being in contact with an entire periphery of said tapered circumferential surface.

6. The driving device according to claim 5, wherein the second shaft end portion includes another tapered circumferential surface and said flywheel includes another tip end in contact with an entire periphery of said another tapered circumferential surface.

* * * * *